EBEN EATON, OF NORWALK, CONNECTICUT.

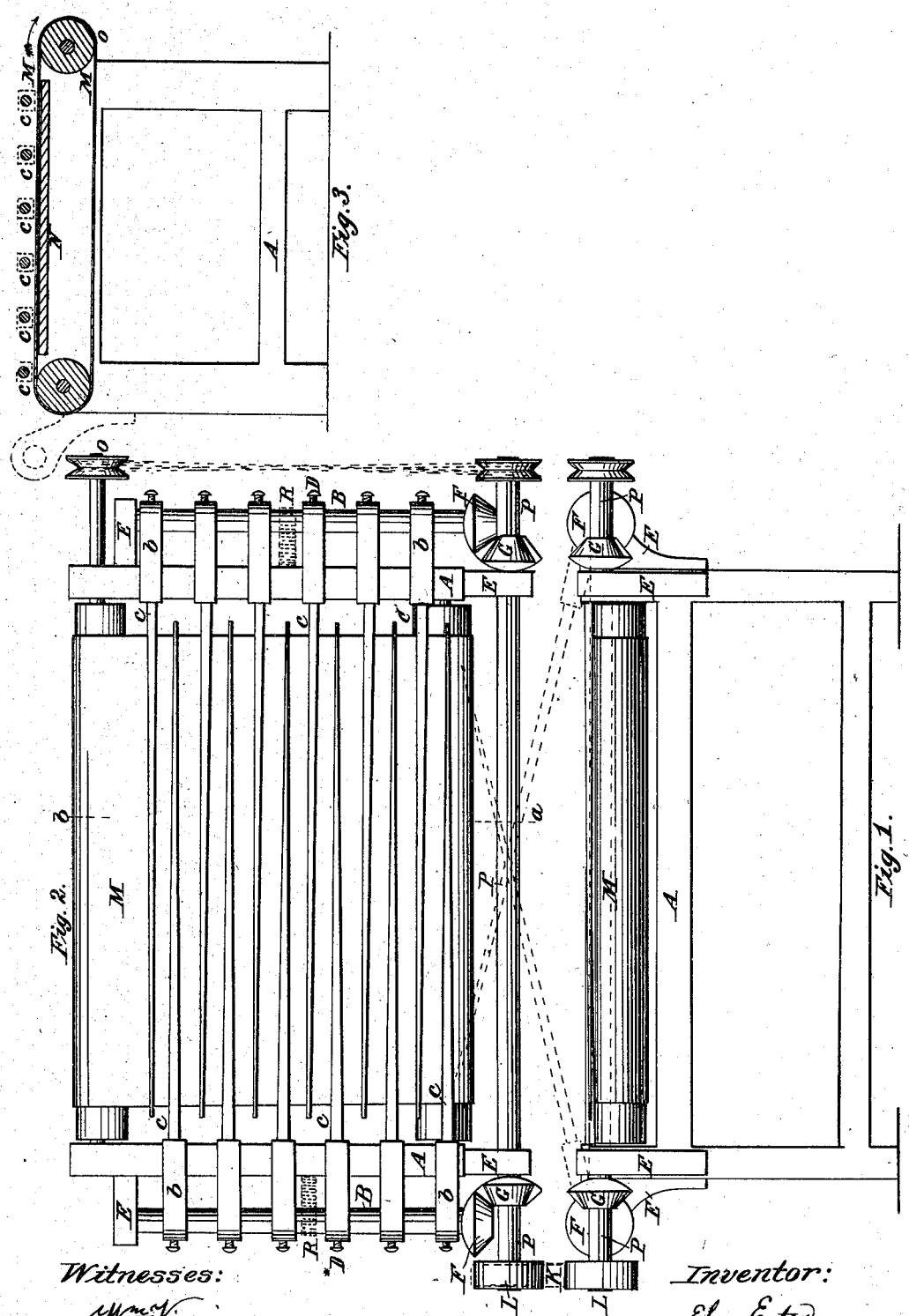

Letters Patent No. 87,330, dated March 2, 1869.

IMPROVEMENT IN MACHINE FOR WHIPPING CLOTH.

The Schedule referred to in these Letters Patent and making part of the same.

*To all whom it may concern:*

Be it known that I, EBEN EATON, of the town of Norwalk, county of Fairfield, and State of Connecticut, have invented a new and useful Improvement in the Mode of Constructing Whipping-Machines for Whipping Woollen Cloth, to raise the nap on the same; and I do hereby declare that the following is a full and exact description thereof, reference being had to the accompanying drawing, and to the letters of reference marked thereon.

The nature of my invention consists in the arrangement of a series of whips, attached to shafts, actuated by toothed gear-wheels, with a flat beating-board, or bed, between the endless apron, the same to be attached to the cloth-shearing machine, and forming part thereof when in operation.

To enable others skilled in the art to make and use my invention, I will proceed to describe its construction and operation.

In the drawing—

Figure 1 is a transverse view of the front of the whipper.

Figure 2 is a plan view of the same.

Figure 3 is a cross-section from *a* to *b*.

There is a whipping-machine now in use, but the machinery composing the same is very extensive and costly.

My improvement consists in a cheap and simple machine, to effect the same purpose.

I make the frame A, as shown in the drawing, to receive the various parts of the operating-machinery, of either wood or metal.

The shafts B B receive sockets, or stems *b*, of the whips *c*, which are attached and adjusted by means of the set-screws D.

These shafts B B are supported by the bearings E, and vibrate in the same.

On one end of each of the shafts B B is a bevelled gear, F, or its equivalent, with one projecting tooth, for the projecting tooth of the bevelled gear G G to strike against as it revolves, causing the shafts B B to partially revolve or vibrate, and operate the rise-and-fall movement of the whips *c*. The gears G may contain one or more teeth or projections, as the case or speed may require.

The shaft P runs transversely and at right angles with the shafts B B, and a gear, G, is attached near each end of the same, which is actuated by means of a belt, K, on the pulley L. This belt runs to and on a pulley of the shearing-machine, which transmits motion to the whole.

The endless apron M receives and conveys the cloth from the shearer, to be operated on by the whips as it travels longitudinally on the apron.

Between the upper and lower surfaces of the apron M, and close up to the upper, I place a beating-board, N, covered with a soft felt, or other similar substance, to keep the cloth, which is being operated on by the whips, from sagging in the middle between the rollers, and, by so doing, presenting a straight, even surface to the blows of the whips *c*.

A pulley, *o*, is attached to the end of the endless-belt roller, and a belt runs from the same to a pulley on the end of the transverse shaft P, to actuate the apron M.

Springs R are attached to the vibrating shaft B, to cause the return-action or striking-movement of the whips *c*.

I do not claim as new a machine for whipping cloth, to raise the nap.

What I claim as my invention, and desire to secure by Letters Patent, is—

The combination, in a cloth-whipping machine, of the whips *b* and *c*, shafts B and P, gears F and G, and beating-board N, arranged and constructed in the manner substantially as and for the purpose herein specified.

EBEN EATON.

Witnesses:
WM. VINE,
ALFRED H. CAMP.